US009959083B2

(12) United States Patent
Sugaya

(10) Patent No.: US 9,959,083 B2
(45) Date of Patent: May 1, 2018

(54) SYSTEM AND METHOD FOR SHARING SCREEN

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 72 days.

(21) Appl. No.: 15/049,211

(22) Filed: Feb. 22, 2016

(65) Prior Publication Data
US 2017/0131961 A1    May 11, 2017

(30) Foreign Application Priority Data
Nov. 10, 2015    (JP) .................. 2015-220775

(51) Int. Cl.
| | |
|---|---|
| G06F 15/00 | (2006.01) |
| G10L 25/00 | (2013.01) |
| G10L 15/26 | (2006.01) |
| G06F 3/14 | (2006.01) |
| G06F 3/16 | (2006.01) |

(52) U.S. Cl.
CPC ............ G06F 3/1454 (2013.01); G06F 3/167 (2013.01); G10L 15/26 (2013.01)

(58) Field of Classification Search
None
See application file for complete search history.

(56) References Cited

U.S. PATENT DOCUMENTS

| | | | | |
|---|---|---|---|---|
| 5,844,979 A | * | 12/1998 | Raniere | H04L 12/18 348/14.08 |
| 5,950,167 A | * | 9/1999 | Yaker | G06F 3/16 704/270 |
| 2006/0161624 A1 | * | 7/2006 | Montgomery | H04L 29/06 709/204 |
| 2008/0002949 A1 | * | 1/2008 | Tokunaka | G11B 27/031 386/338 |
| 2014/0214426 A1 | * | 7/2014 | Kanevsky | G10L 15/08 704/257 |
| 2014/0220943 A1 | * | 8/2014 | Yang | H04L 67/06 455/414.1 |
| 2014/0350936 A1 | * | 11/2014 | Kanai | G10L 15/30 704/251 |

(Continued)

FOREIGN PATENT DOCUMENTS

JP    2014-241524 A    12/2014

*Primary Examiner* — Richemond Dorvil
*Assistant Examiner* — Thuykhanh Le
(74) *Attorney, Agent, or Firm* — Lex IP Meister, PLLC

(57) ABSTRACT

The present invention is to provide a system for sharing a screen and a method for sharing a screen to easily understand a work instruction even when it is difficult for the worker to catch a voice due to a surrounding noise etc. A system for sharing a screen including a screen transmitter device 100 providing screen data and one or more screen receiver devices 10, the screen transmitter device 100 sharing a screen with the screen receiver devices 10, the system receives a definition of the shared area to share screen display, receives a voice input, converts the input voice into text data by voice recognition, and displays both of screen data inside the shared area defined by the received definition and the converted text data in the shared area.

15 Claims, 10 Drawing Sheets

(56) References Cited

U.S. PATENT DOCUMENTS

| | | | |
|---|---|---|---|
| 2014/0379343 A1* | 12/2014 | Karimi-Cherkandi | G10L 21/02 704/246 |
| 2015/0073789 A1* | 3/2015 | Hashimoto | G10L 15/265 704/235 |
| 2015/0081302 A1* | 3/2015 | Syrdal | G10L 17/24 704/249 |
| 2015/0145770 A1* | 5/2015 | Hoshuyama | G06F 3/167 345/156 |
| 2015/0364141 A1* | 12/2015 | Lee | G06F 3/167 704/235 |
| 2016/0041833 A1* | 2/2016 | Standley | G06F 9/445 718/100 |
| 2016/0064002 A1* | 3/2016 | Kim | G10L 15/22 704/246 |
| 2016/0118044 A1* | 4/2016 | Bondarev | G10L 15/26 704/235 |
| 2016/0124940 A1* | 5/2016 | Cecchi | G06F 17/2785 704/9 |
| 2016/0133257 A1* | 5/2016 | Namgoong | G10L 15/26 704/235 |
| 2016/0197871 A1* | 7/2016 | Bender | H04L 51/32 709/206 |
| 2016/0210276 A1* | 7/2016 | Kawano | G06F 3/167 |
| 2016/0283855 A1* | 9/2016 | Cecchi | G06N 7/005 |
| 2016/0344567 A1* | 11/2016 | Navale | H04L 12/1822 |
| 2016/0378417 A1* | 12/2016 | Kenjalkar | G06F 3/1423 345/2.2 |
| 2017/0118271 A1* | 4/2017 | Reyes | H04L 67/06 |

* cited by examiner

Fig. 8

DISPLAY MODE TABLE

| Device data | Color | Size |
|---|---|---|
| AAAA | Red | 10pt |
| BBBB | Blue | 10pt |

SYSTEM AND METHOD FOR SHARING SCREEN

CROSS REFERENCE TO RELATED APPLICATIONS

This application claims priority to Japanese Patent Application No. 2015-220775 filed on Nov. 10, 2015, the entire contents of which are incorporated by reference herein.

TECHNICAL FIELD

The present invention relates to a system for sharing a screen including a screen transmitter device providing screen data and one or more screen receiver devices, the screen transmitter device sharing a screen with the screen receiver devices.

BACKGROUND ART

Recently, a screen is shared between a screen transmitter device operated by a worker and a screen receiver device operated by an instructor by using public line network, such as Internet network. In such a screen sharing, a screen transmitter device and an screen receiver device share a screen displaying an image of a working area taken by a worker, and an instructor inspects the image and conveys a work instruction by voice through a telephone call etc.

For instance, Patent Document 1 discloses a configuration that information is shared through the Internet by transferring images and voices, and the voice data transmitted from other site is output as a voice to a terminal used in a site.

CITATION LIST

Patent Literature

Patent Document 1: JP 2014-241524A

SUMMARY OF INVENTION

However, in the constitution of Patent Document 1, when a worker receives a work instruction by voice at a construction site etc., there is a problem that it is difficult for the worker to catch the voice due to a surrounding noise, and the work instruction could not be easily understood.

Then, in the present invention, the inventor has paid attention that the work instruction is easy to be understood by displaying the instructor's voice data as a text message.

Accordingly, an objective of the present invention is to provide a system for sharing a screen and a method for sharing a screen to easily understand a work instruction even when it is difficult for the worker to catch a voice due to a surrounding noise etc.

According to the first aspect of the present invention, a system for sharing a screen including a screen transmitter device providing screen data and one or more screen receiver devices, the screen transmitter device sharing a screen with the screen receiver devices, the system includes:

a definition receiver unit that receives a definition of a shared area to share screen display;

a voice input receiver unit that receives a voice input;

a converter unit that converts the input voice into text data by voice recognition; and a display unit that displays both of screen data inside the shared area defined by the received definition and the converted text data inside the shared area.

According to the first aspect of the present invention, a system for sharing a screen including a screen transmitter device providing screen data and one or more screen receiver devices, the screen transmitter device sharing a screen with the screen receiver devices, the system receives a definition of the shared area to share screen display, receives a voice input, converts the input voice into text data by voice recognition, and displays both of screen data inside the shared area defined by the received definition and the converted text data inside the shared area.

The first aspect of the present invention falls into the category of a system for sharing a screen, but the categories of a method for sharing screen, etc., have the same functions and effects.

According to the second aspect of the present invention, a system for sharing a screen including a screen transmitter device providing screen data and one or more screen receiver devices, the screen transmitter device sharing a screen with the screen receiver devices, the system includes:

a definition receiver unit that receives a definition of the shared area to share screen display;

a voice input receiver unit that receives a voice input;

a converter unit that converts the input voice into text data by voice recognition; and a display unit that displays screen data of the defined shared area and the converted text data inside and outside the defined shared area, respectively.

According to the second aspect of the present invention, a system for sharing a screen including a screen transmitter device providing screen data and one or more screen receiver devices, the screen transmitter device sharing a screen with the screen receiver devices, the system receives a definition of the shared area to share screen display, receives a voice input, converts the input voice into text data by voice recognition, and displays screen data of the defined shared area and the converted text data inside and outside the defined shared area, respectively.

The second aspect of the present invention falls into the category of a system for sharing a screen, but the categories of a method for sharing a screen, etc., have the same functions and effects.

According to the third aspect of the present invention, the system for sharing a screen according to the first aspect of the present invention, includes an output unit that outputs the text data into a file.

According to the third aspect of the present invention, the system for sharing a screen according to the first aspect of the present invention outputs the text data into a file.

According to the fourth aspect of the present invention, the system for sharing a screen according to any one of the first to the third aspects of the present invention, includes an associating unit that associates the text data with the screen data of the shared area.

According to the fourth aspect of the present invention, the system for sharing a screen according to the first aspect of the present invention associates the text data with the screen data of the shared area.

According to the fifth aspect of the present invention, the system for sharing a screen according to the first aspect of the present invention, includes a changing unit that changes the display mode of the displayed text data based on the converted text data.

According to the fifth aspect of the present invention, the system for sharing a screen according to the first aspect of the present invention changes the display mode of the displayed text data based on the converted text data.

According to the sixth aspect of the present invention, a method for sharing a screen between or among a screen transmitter device providing screen data and one or more screen receiver devices, includes the steps of:

receiving a definition of the shared area to share screen display;

receiving a voice input;

converting the input voice into text data by voice recognition; and displaying both of screen data inside the shared area defined by the received definition and the converted text data inside the shared area.

According to the seventh aspect of the present invention, a method for sharing a screen between or among a screen transmitter device providing screen data and one or more screen receiver devices, includes the steps of:

receiving a definition of the shared area to share screen display;

receiving a voice input;

converting the input voice into text data by voice recognition; and displaying the screen data of the defined shared area and the converted text data inside and outside the defined shared area, respectively.

The present invention can provide a system for sharing a screen and a method for sharing a screen to easily understand a work instruction even when it is difficult for a worker to catch a voice due to a surrounding noise etc.

BRIEF DESCRIPTION OF DRAWINGS

FIG. 8 shows the display mode table.

DESCRIPTION OF EMBODIMENTS

Embodiments of the present invention are described below with reference to the attached drawings. However, this is illustrative only, and the technological scope of the present invention is not limited thereto.

Outline of System for Sharing a Screen 1

Figure 1:
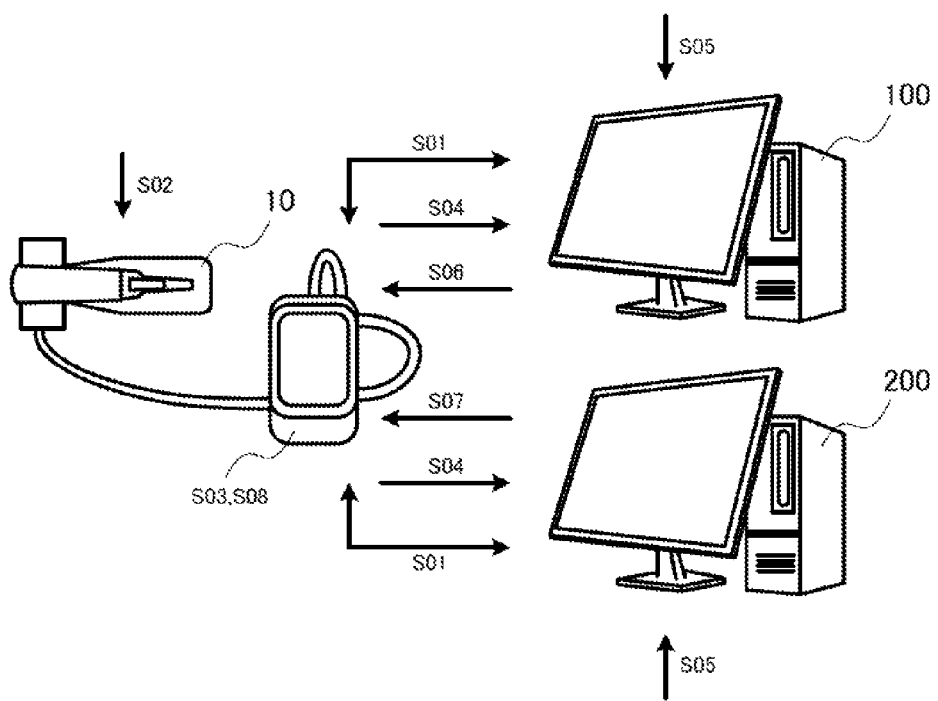
FIG. 1 is a schematic diagram of the system for sharing a screen 1.

The outline of the present invention is described based on FIG. 1. FIG. 1 shows an overview of the system for sharing a screen 1 according to a preferred embodiment of the present invention. The system for sharing a screen 1 includes a screen transmitter device 10, the first screen receiver device 100, and the second screen receiver device 200. The number of the screen receiver device is not limited to two and may be equal or more than three, or one. Furthermore, the number of the screen transmitter device 10 is not be limited to one and may be more than one. Moreover, each process described later may be performed by either or both of the screen transmitter device and the screen receiver device.

The screen transmitter device 10 is a wearable terminal or an electrical appliance with a data communication function and a camera function, etc. Examples of the screen transmitter device 10 include a wearable terminal such as a glasses type terminal, and a head mounted display and electrical appliances such as a mobile phone, a mobile terminal, a personal computer, a net book terminal, a slate terminal, an electronic book terminal, and a portable music player.

Moreover, the first screen receiver device 100 and the second screen receiver device 200 are electrical appliances with a data communication function etc. The first screen receiver device 100 and the second screen receiver device 200 are wearable terminals, electrical appliances, and a terminal device of the unredeemable type similar to the screen transmitter device 10.

First, the screen transmitter device 10, the first screen receiver device 100, and the second screen receiver device 200 establish a network necessary for the screen sharing and a communication necessary for the voice call (step S01).

The screen transmitter device 10 takes an image of a working area where a worker works (step S02).

The screen transmitter device 10 receives the definition of the shared area sharing an image display (step S03). The screen transmitter device 10 displays the image in the shared area.

The screen transmitter device 10 transmits the image data to the first screen receiver device 100 and the second screen receiver device 200 (step S04).

The first screen receiver device 100 and the second screen receiver device 200 receive and display the image data. The first screen receiver device 100 and the second screen receiver device 200 receive the voice input from the instructor (step S05).

The first screen receiver device 100 recognizes a voice data based on the received voice input, converts the voice data into text data, displays the text data in a message display area as a message, and also transmits the text data to screen transmitter device 10 (step S06). In step S06, the first screen receiver device 100 transmits device data related to itself simultaneously with voice data. The device data includes an identifier for identifying a terminal, IP address and MAC address of the terminal.

The second screen receiver device 200 recognizes a voice data based on the received voice input, converts the voice data into text data, displays the text data in a message display area as a message, and also transmits the text data to the screen transmitter device 10 (step S07). In step S07, the second screen receiver device 200 transmits device data related to itself simultaneously with voice data. The device data includes an identifier for identifying a terminal, IP address and MAC address of the terminal.

The screen transmitter device 10 receives the text data, and displays it in the message display area as a message (step S08). In step S08, the screen transmitter device 10 displays an image and a message display area inside the shared area based on the predetermined input and condition. In step S08, the screen transmitter device 10 also displays the image of the defined shared area and a message display area inside and outside the defined shared area, respectively based on the predetermined input and condition.

Each step mentioned above may be executed by either or both of the screen transmitter device 10 or the first screen receiver device 100 or/and the second screen receiver device 200. Moreover, a specific step among each step mentioned above may be executed by the screen transmitter device 10 or the first screen receiver device 100 and the second screen receiver device 200.

System Configuration of the System for Sharing a Screen 1

Figure 2:
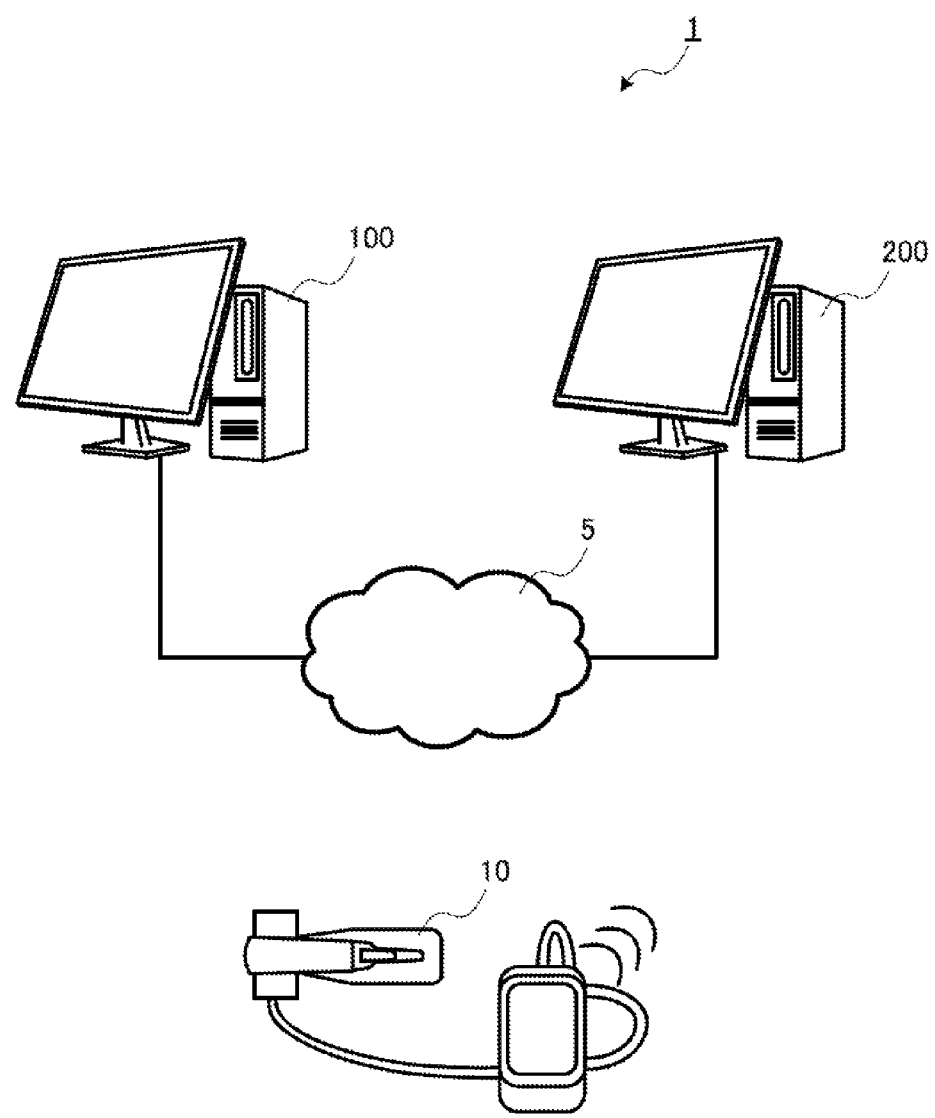
FIG. 2 is an overall configuration diagram of a remote instruction system 1 of the system for sharing a screen 1.

The system configuration of the system for sharing a screen 1 is described based on FIG. 2. FIG. 2 shows a block diagram illustrating a system for sharing a screen 1 according to a preferable embodiment of the present invention. The system for sharing a screen 1 includes the screen transmitter device 10, the first screen receiver device 100, the second screen receiver device 200, and public line network 5 (Internet network and the third and fourth generation communication network, etc.). In the system for sharing a screen 1, the screen transmitter device 10 may be connected with the first screen receiver device 100 and the second screen receiver device 200 through a server device. In this case, the screen transmitter device 10 and the first screen receiver device 100 and the second screen receiver device 200 execute various data communications through a server device.

The screen transmitter device 10 has functions to be described later and a capability of data communication, which is a wearable terminal and an electrical appliance described above.

The first screen receiver device 100 and the second screen receiver device 200 have functions to be described later and a capability of data communication, which is a wearable terminals, an electrical appliances, and terminal devices of the unredeemable type described above.

Functions

Figure 3:
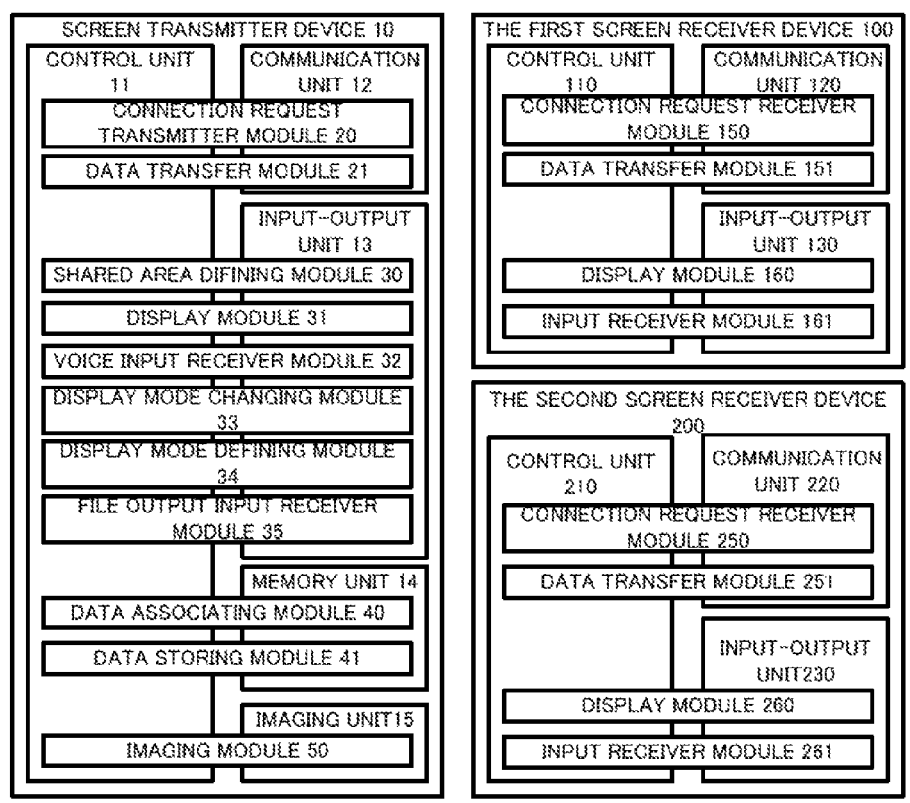
FIG. 3 is a functional block diagram of the screen transmitter device 10, the first screen receiver device 100, and the second screen receiver device 200.

The structure of each device will be described below based on FIG. 3. FIG. 3 shows a functional block diagram of the screen transmitter device 10, the first screen receiver device 100, and the second screen receiver device 200 according to a preferred embodiment of the present invention.

The screen transmitter device 10 includes a control unit 11 including a central processing unit (hereinafter referred to as "CPU"), a random access memory (hereinafter referred to as "RAM"), and a read only memory (hereinafter referred to as "ROM"); and a communication unit 12 such as a device capable of communicating with other devices, for example, a Wireless Fidelity or Wi-Fi® enabled device complying with IEEE 802.11.

The screen transmitter device 10 also includes an input-output unit 13 including a display unit outputting and displaying data and images that have been processed by the control unit 11; an input unit such as a microphone that collects voice, a touch panel, a keyboard, or a mouse that receives an input from a user, and an output unit such as speaker that outputs voice data. The screen transmitter device 10 also includes a device capable of acquiring its own location information from GPS, etc. The screen transmitter device 10 also includes a memory unit 14 such as a hard disk, a semiconductor memory, a recording medium, or a memory card to store data. The screen transmitter device 10 also includes an imaging unit 15 such as an imaging device taking still and moving images, etc., and a lens.

In the screen transmitter device 10, the control unit 11 reads a predetermined program to run a connection request transmitter module 20, a data transfer module 21 in cooperation with the communication unit 12. Furthermore, in the screen transmitter device 10, the control unit 11 reads a predetermined program to run a shared area defining module 30, a display module 31, a voice input receiver module 32, a display mode changing module 33, a display mode defining module 34, and a file output input receiver module 35 in cooperation with the input-output unit 13. Furthermore, in the screen transmitter device 10, the control unit 11 reads a predetermined program to run a data associating module 40, and a data storing module 41 in cooperation with the memory unit 14. Furthermore, in the screen transmitter device 10, the control unit 11 reads a predetermined program to run an imaging module 50 in cooperation with the imaging unit 15.

The first screen receiver device 100 includes a control unit 110 including a CPU, a RAM, and a ROM; and a communication unit 120 such as a device capable of communicating with other devices, for example, a Wireless Fidelity or Wi-Fi® enabled device complying with IEEE 802.11 in the same way as the screen transmitter device 10.

The first screen receiver device 100 also includes an input-output unit 130 including a display unit outputting and displaying data and images that have been processed by the control unit 110; an input unit such as a microphone that collects voice, a touch panel, a keyboard, or a mouse that receives an input from a user, and an output unit such as speaker that outputs voice data in the same way as the screen transmitter device 10. The first screen receiver device 100 also includes a device capable of acquiring its own location information from GPS, etc. in the same way as the screen transmitter device 10. Moreover, the first screen receiver device 100 also includes a storage unit as the memory unit in the same way as the screen transmitter device 10.

In the first screen receiver device 100, the control unit 110 reads a predetermined program to run a connection request receiver module 150, a data transfer module 151 in cooperation with the communication unit 120. Furthermore, in the first screen receiver device 100, the control unit 110 reads a predetermined program to run a display module 160, and an input receiver module 161 in cooperation with the input-output unit 130.

The second screen receiver device 200 includes a control unit 210 including a CPU, a RAM, and a ROM; and a communication unit 220 such as a device capable of communicating with other devices, for example, a Wireless Fidelity or Wi-Fi® enabled device complying with IEEE 802.11 in the same way as the first screen receiver device 100.

The second screen receiver device 200 also includes an input-output unit 230 including a display unit outputting and displaying data and images that have been processed by the control unit 210; an input unit such as a microphone that collects voice, a touch panel, a keyboard, or a mouse that receives an input from a user, and an output unit such as speaker that outputs voice data in the same way as the first screen receiver device 100. The second screen receiver device 200 also includes a device capable of acquiring its own location information from GPS, etc. in the same way as the first screen receiver device 100. Moreover, the second screen receiver device 200 includes a storage unit as a memory unit in the same way as the first screen receiver device 100.

In the second screen receiver device 200, the control unit 210 reads a predetermined program to run a connection request receiver module 250, and a data transfer module 251 in cooperation with the communication unit 220. Furthermore, in the second screen receiver device 200, the control unit 210 reads a predetermined program to run a display module 260, and an input receiver module 261 in cooperation with the input-output unit 230.

Screen Sharing Process

Figure 4:
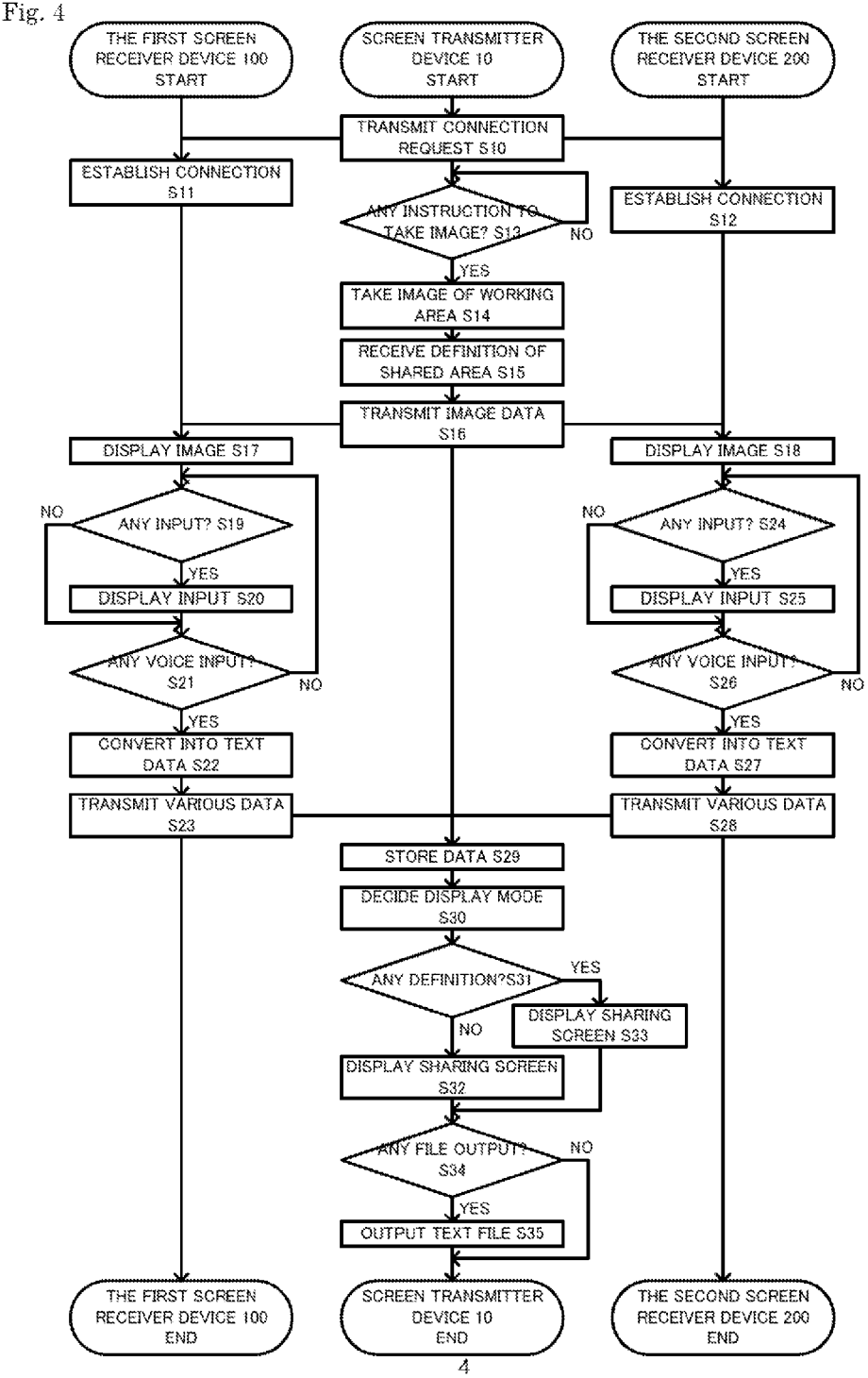
FIG. 4 is a flow chart of the screen sharing process executed by the screen transmitter device 10, the first screen receiver device 100, and the second screen receiver device 200.

The screen sharing process executed by the screen transmitter device 10, the first screen receiver device 100, and the second screen receiver device 200 is described based on FIG. 4. FIG. 4 is a flow chart of the screen sharing process executed by the screen transmitter device 10, the first screen receiver device 100, and the second screen receiver device 200. The tasks executed by the modules of each of the above-mentioned devices will be explained below together with the process.

First, the connection request transmitter module 20 transmits a connection request for establishing a network connecting necessary for the screen sharing and the voice call with the first screen receiver device 100 and the second screen receiver device 200 (step S10).

The connection request receiver module 150 receives the connection request transmitted from the screen transmitter device 10. The first screen receiver device 100 establishes a network connection for the screen sharing and the voice call with the screen transmitter device 10 (step S11).

The connection request receiver module 250 receives the connection request transmitted from the screen transmitter device 10. The second screen receiver device 200 establishes a network connection for the screen sharing and the voice call with the screen transmitter device 10 (step S12).

The imaging module 50 judges whether or not the imaging module 50 has received an instruction to take an image of a working area (step S13). In step S13, if judging that the imaging module 50 has not received an instruction to take an image of the working area (NO), the imaging module 50 repeats the process until receiving an instruction to take an image.

On the other hand, if judging the imaging module 50 has received an instruction to take an image of the working area (YES), the imaging module 50 takes an image of the working area (step S14).

The shared area defining module 30 receives a definition of the shared area in which the screen display is shared for the image (step S15). In step S15, the shared area defining module 30 defines the shared area based on a worker's input.

Figure 5:
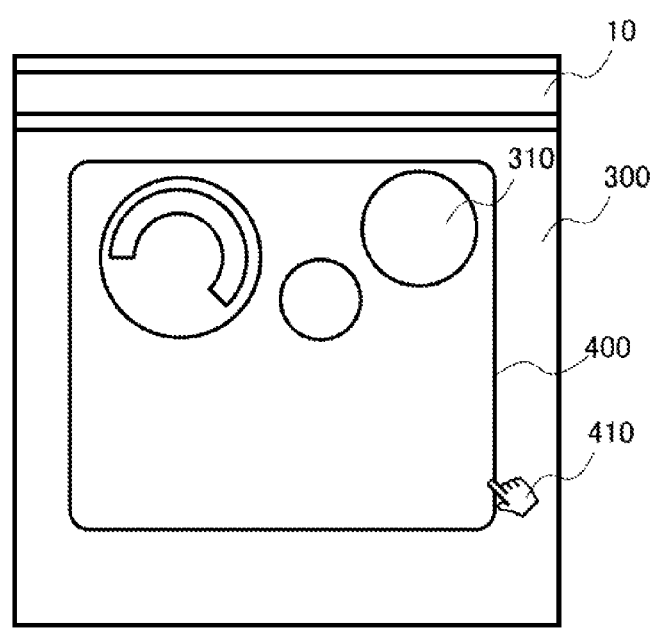
FIG. 5 shows a shared area 400 displayed by the screen transmitter device 10.

FIG. 5 shows a shared area 400 defined by the shared area defining module 30. In FIG. 5, the display module 31 displays the image 310 in the screen display window 300. The shared area defining module 30 defines the shared area 400 in the image 310. The shared area 400 is defined by enclosing a predetermined area of the image 310 by using the instruction icon 410. The instruction icon 410 shows the point tapped by a user. Moreover, the shared area 400 may be defined by dragging an icon with a predetermined shape, etc. or may be defined by other methods.

The data transfer module 21 transmits the image data taken in step S14 to the first screen receiver device 100 and the second screen receiver device 200 (step S16).

The data transfer module 151 receives the image data. The display module 160 displays the image based on the received image data (step S17).

Figure 6:
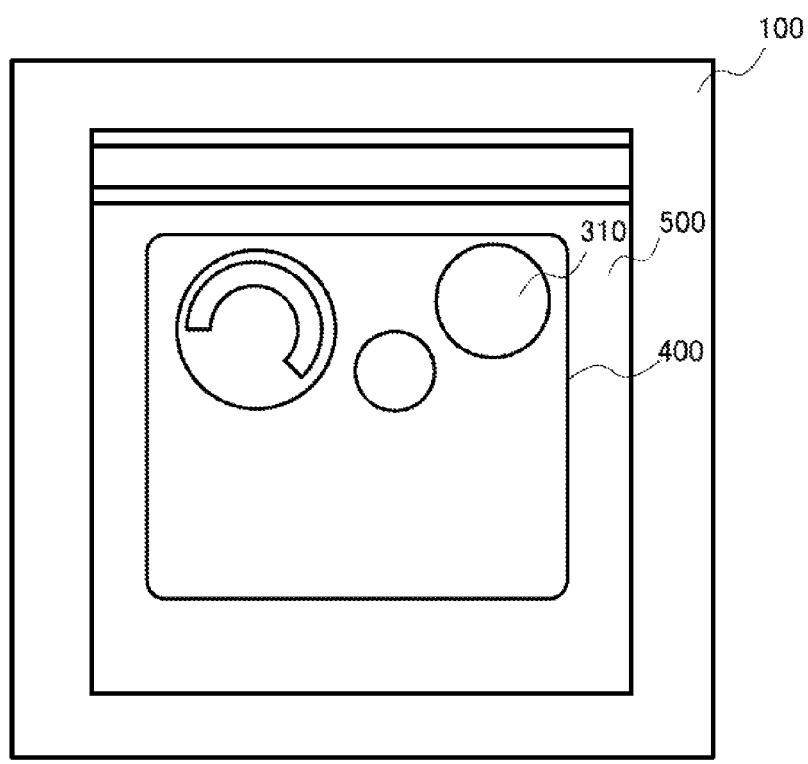
FIG. 6 shows an image 310 displayed by the first screen receiver device 100.

FIG. 6 shows the image 310 displayed by the first screen receiver device 100. In FIG. 6, the display module 160 displays the image 310 to be screen-shared in the shared area 400 displayed inside the screen display window 500. The shared area 400 is a shared area defined by the screen transmitter device 10.

The data transfer module 251 receives the image data. The display module 260 displays the image based on the received image data (step S18). In step S18, the second screen receiver device 200 displays the image in the same way as the first screen receiver device 100.

The input receiver module 161 judges whether or not the input receiver module 161 has received an input operation to the shared area from an instructor (step S19).

In step S19, if judging that the input receiver module 161 has received the input operation (YES), the input receiver module 161 displays the received input to the shared area (step S20).

Figure 7:
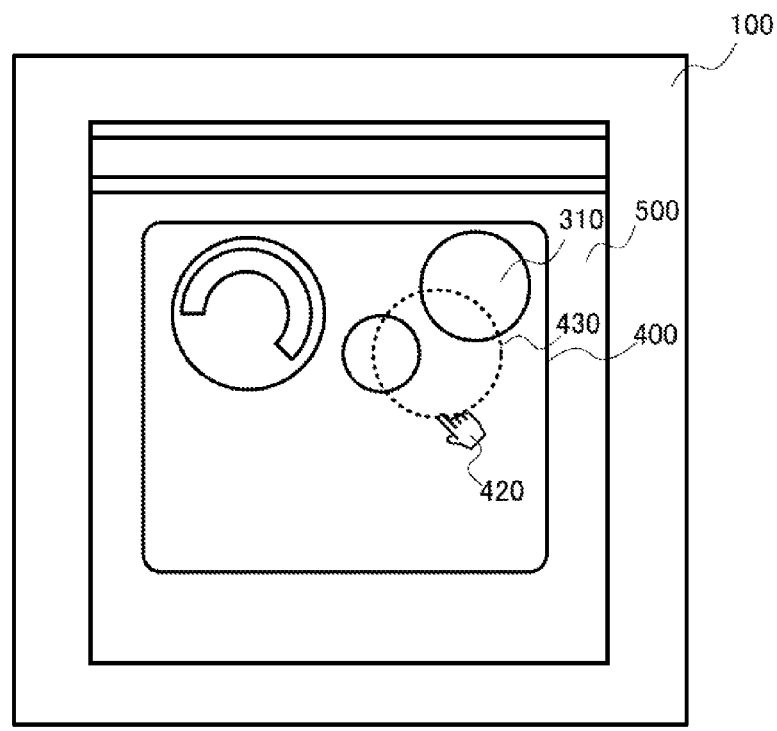
FIG. 7 shows an input operation received by the first screen receiver device 100.

FIG. 7 shows an input operation received by the input receiver module 161. In FIG. 7, the input receiver module 161 receives the input of the instruction line 430 by operating the instruction icon 420. The display module 160 displays the instruction line 430 in shared area 400 based on the accepted input. The instruction line 430 may be not defined by operating the instruction icon 420 but may be defined by dragging an icon with a predetermined shape, etc. or may be defined by other methods. Moreover, the shape of the instruction line 430 can be changed as appropriate.

On the other hand, if judging that the input receiver module 161 has not received the input operation (NO), the input receiver module 161 judges whether or not the input receiver module 161 has received a voice input from an instructor (step S21).

In step S21, if judging that the input receiver module 161 has not received the voice input (NO), the input receiver module 161 repeats the process of step S19 mentioned above.

If judging that the input receiver module 161 has received the voice input (YES), the input receiver module 161 recognizes the input voice and converts it into text data (step S22).

The data transfer module 151 transmits the converted text data, the instruction data of the received instruction line, the device data identifying itself, and the time data indicating the current time to the screen transmitter device 10 (step S23). The device data includes an identifier for identifying a terminal, IP address and MAC address of the terminal.

The input receiver module 261 judges whether or not the input receiver module 261 has received an input operation to the shared area from an instructor (step S24). The process of step S24 is similar to the process of step S19 mentioned above.

In step S24, if judging that the input receiver module 261 has received an input operation (YES), the input receiver module 261 displays the received input to the shared area (step S25). The process of step S25 is similar to the process of step S20 mentioned above.

On the other hand, if judging that the input receiver module 261 has not received a input operation (NO), the input receiver module 261 judges whether or not the input receiver module 261 has received a voice input from an instructor (step S26). The process of step S26 is similar to the process of step S21 mentioned above.

In step S26, if judging that the input receiver module 261 has not received a voice input (NO), the input receiver module 261 repeats the process of step S24 mentioned above.

If judging that the input receiver module 261 has received a voice input (YES), the input receiver module 261 recognizes the input voice and converts it into text data (step S27). The process of step S27 is similar to the process of step S22 mentioned above.

The data transfer module 251 transmits the converted text data, the instruction data of the received instruction line, the device data identifying itself, and the time data indicating the current time to the screen transmitter device 10 (step S28). The device data includes an identifier for identifying a terminal, IP address and MAC address of the terminal. The process of step S28 is similar to the process of step S23 mentioned above.

The data transfer module 21 receives the text data, the instruction data, the device data, and the time data transmitted from the first screen receiver device 100 and the second screen receiver device 200. The data associating module 40 associates and stores the received text data with the image data of the image and the time data displayed in the shared area (step S29).

The display mode changing module 33 searches the display mode table stored by the data storing module 41 and decides the display mode of the text data based on the received device data (step S30). In step S30, the display mode changing module 33 decides the display mode of the text data transmitted from the first screen receiver device 100 and the second screen receiver device 200, respectively.

Display Method Table

FIG. 8 shows the display mode table stored by the data storing module 41. The display mode table is a table associating a device identifier with a size and a color of the character. This embodiment will be explained below assuming that the first screen receiver device 100 includes AAAA as device data, and the second screen receiver device 200 includes BBBB as device data.

In FIG. 8, the data storing module 41 associates and stores a device data "AAAA" with a color "Red" and a size "10pt". That is, when the display mode changing module 33 displays the text data transmitted from the first screen receiver device 100 as a message described later, the text color is displayed with "Red", and the character size is displayed as "10pt" based on the association. Moreover, the data storing module 41 associates and stores a device data "BBBB" with a color "Blue" and a size "10pt". That is, when the display mode changing module 33 displays the text data transmitted from the second screen receiver device 200 as a message described later, the text color is displayed with "Blue", and the character size is displayed as "10pt" based on the association. As for the data storing module 41, the font and other content may be associated with in addition to the color and the size of the character. Moreover, the device data may be MAC address, IP address etc. of the device instead of the identifier for identifying the device, or may be other data.

The display mode defining module 34 judges whether or not the display mode defining module 34 has received a definition of display mode (step S31). In step S31, the display mode defining module 34 receives the definition of the display mode of the text data as definition of the display mode. In step S31, the display mode defining module 34 judges whether or not the display mode defining module 34 has received an input about whether or not the message based on the text data is displayed outside the shared area. In step S31, the voice input receiver module 32 may collect a surrounding voice, judge whether or not the voice is more than a predetermined decibel, and define the display mode based on the result of the judgment. Moreover, in step S31, the display mode defining module 34 may receive an input about whether or not the message based on the text data is displayed inside the shared area.

Figure 9:
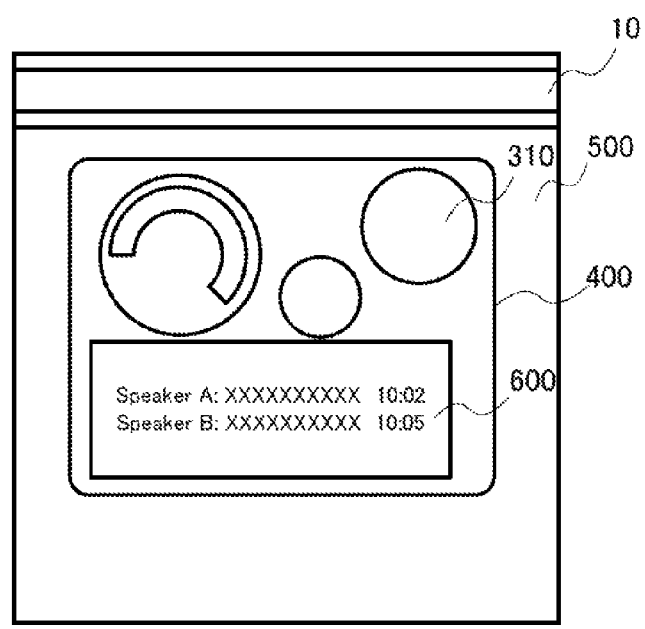
FIGS. 9 and 10 each show an image 310 and a message displayed by the screen transmitter device 10.

In step S31, if judging that the display mode defining module 34 has not received a definition of display mode (NO), the display 31 displays the image and the message based on the received text data on the sharing screen shown in FIG. 9 (step S32).

FIG. 9 is a sharing screen showing an image and a message displayed by the display module 31. In FIG. 9, the display module 31 displays the image 310 and the message display area 600 displaying the message based on the text data inside the shared area 400 which is displayed in the screen display window 500. That is, the display module 31 places the message on top of the image 310.

The message display area 600 displayed by the display module 31 displays a caller's identifier, a text message converted from the voice input by a caller, and a time that a caller begins the call based on the device data.

Figure 10:
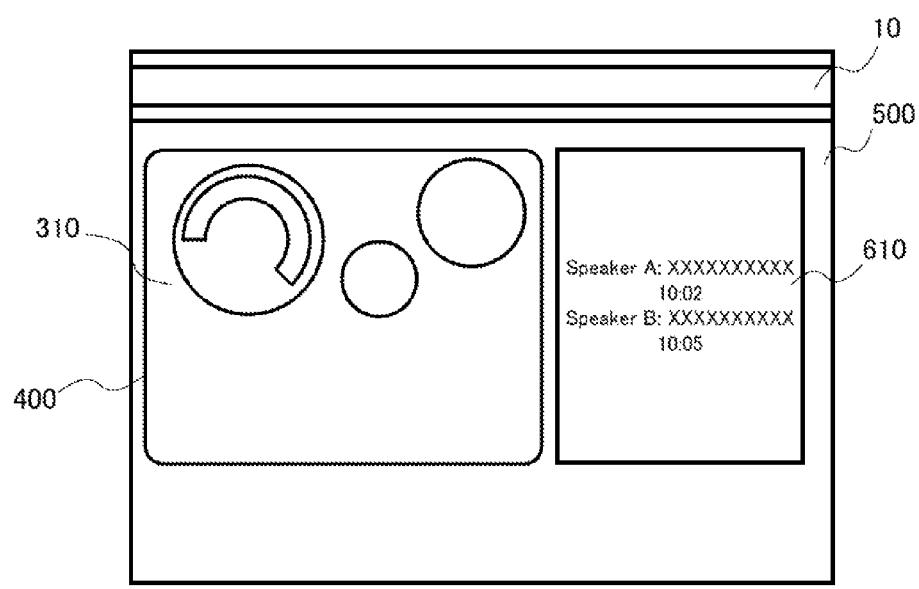

In step S31, if judging that the display mode defining module 34 has received a definition of display mode (YES), the display module 31 displays the image and the message based on the received text data as sharing screen shown in FIG. 10 (Step 33).

FIG. 10 is a sharing screen showing an image and a message displayed by the display module 31. In FIG. 10, the display module 31 displays the shared area 400 and the message display area 610 inside the screen display window 500, respectively. The display module 31 displays the image 310 in the shared area 400. Moreover, the display module 31 displays the message based on the text data in the message display area 610.

The message display area 600 displayed by the display module 31 displays a caller's identifier, a text message converted from the voice input by a caller, and a time that a caller begins the call based on the device data.

The file output input receiver module 35 judges whether or not the file output input receiver module 35 has received an input of outputting the text data into a file (step S34). In step S34, if judging that the file output input receiver module 35 has not received an input (NO), the file output input receiver module 35 terminates the process.

In step S34, if judging that the file output input receiver module 35 has received an input (YES), the data storing module 41 outputs and stores the received text data in a file (step S35). In step S35, two or more text data is output into a text file of the text data stored by the data storing module 41. That is, the output text file outputs and stores data including two or more messages aligned in chronological order, in which each message includes a caller's identifier, a converted text message and a started time of a call.

In the embodiment mentioned above, each device of the embodiment mentioned above needs not have the each described module, and for example, either or both of the screen transmitter device 10 or/and the first screen receiver device 100 or/and the second screen receiver device 200 may each have all modules, or may have only a specific module.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the recording medium, forwards and stores the program to and in an internal or an external storage, and executes it. The program may be previously recorded in, for example, storage (record medium) such as a magnetic disk, an optical disk, or a magnetic optical disk and provided from the storage to a computer through a communication line.

The embodiments of the present invention are described above. However, the present invention is not limited to these embodiments. The effect described in the embodiments of the present invention is only the most preferable effect produced from the present invention. The effects of the present invention are not limited to that described in the embodiments of the present invention.

REFERENCE SIGNS LIST

1 System for sharing a screen
10 Screen transmitter device
100 The first screen receiver device
200 The second screen receiver device

What is claimed is:

1. A system for sharing a screen to receive a work instruction at a remote site, the system comprising:
a screen transmitter device providing image data; and
one or more screen receiver devices connected to the screen transmitter device via a network, the screen transmitter device sharing a screen with the screen receiver devices,
wherein each of the screen receiver devices comprises a first central processing unit that executes:
a voice input receiver unit that receives a voice input of a work instruction from an instructor operating said each of the screen receiver devices;
a converter unit that converts the input voice into text data by voice recognition; and
a data transfer unit that transmits the text data to the screen transmitter device, and
wherein the screen transmitter device comprises a second central processing unit that executes:
a definition receiver unit that receives a definition of a shared area of a screen display, the shared area being defined by an operation of a user of the screen transmitter device; and
a display unit that displays image data inside the defined shared area and the text data received from at least one of the screen receiver devices inside the defined shared area.

2. The system for sharing a screen according to claim 1, wherein the second central processing unit further executes an output unit that outputs the text data into a file.

3. The system for sharing a screen according to claim 1, wherein the second central processing unit further executes an associating unit that associates the text data with the image data of the defined shared area.

4. The system for sharing a screen according to claim 1, wherein the second central processing unit further executes a changing unit that changes a display mode of the displayed text data based on the converted text data.

5. The system for sharing a screen according to claim 1, wherein the screen receiver devices include a first screen receiver device and a second screen receiver device, and
wherein the second central processing unit further executes an changing unit that sets a display mode of the text data received from the first screen receiver device to be different from a display mode of the text data received from the second screen receiver device.

6. The system for sharing a screen according to claim 1, wherein the first central processing unit further executes a second display unit that displays the image data received from screen transmitter device, and
wherein the voice input receiver unit receives the voice input after the second display unit displays the image data.

7. A system for sharing a screen to receive a work instruction at a remote site, the system comprising:
a screen transmitter device providing image data; and
one or more screen receiver devices connected to the screen transmitter device via a network, the screen transmitter device sharing a screen with the screen receiver devices,
wherein each of the screen receiver devices comprises a first central processing unit that executes:
a voice input receiver unit that receives a voice input of a work instruction from an instructor operating said each of the screen receiver devices;
a converter unit that converts the input voice into text data by voice recognition; and
a data transfer unit that transmits the text data to the screen transmitter device, and
wherein the screen transmitter device comprises a second central processing unit that executes:
a definition receiver unit that receives a definition of a shared area of a screen display, the shared area being defined by an operation of a user of the screen transmitter device; and
a display unit that displays image data of the defined shared area and the text data received from at least one of the screen receiver devices inside and outside the defined shared data, respectively.

8. The system for sharing a screen according to claim 7, wherein the screen receiver devices include a first screen receiver device and a second screen receiver device, and
wherein the second central processing unit further executes an changing unit that sets a display mode of the text data received from the first screen receiver device to be different from a display mode of the text data received from the second screen receiver device.

9. The system for sharing a screen according to claim 7, wherein the first central processing unit further executes a second display unit that displays the image data received from screen transmitter device, and
wherein the voice input receiver unit receives the voice input after the second display unit displays the image data.

10. A method for sharing a screen between or among a screen transmitter device providing image data and one or more screen receiver devices connected to the screen transmitter device via a network to receive a work instruction at a remote site, comprising:
receiving, by the screen transmitter device, a definition of a shared area to share screen display, the shared area being defined by an operation of a user of the screen transmitter device;
receiving, by at least one of the screen receiver devices, a voice input of a work instruction from an instructor operating said at least one of the screen receiver devices;
converting, by at least one of the screen receiver devices, the input voice into a text data by voice recognition;
transmitting, by at least one of the screen receiver devices, the text data to the screen transmitter device; and
displaying, by the screen transmitter device, image data inside the shared area defined by the received definition and the text data received from at least one of the screen receiver devices inside the defined shared area.

11. The method according to claim 10, wherein the screen receiver devices include a first screen receiver device and a second screen receiver device, and
wherein the method further comprises setting a display mode of the text data received from the first screen receiver device to be different from a display mode of the text data received from the second screen receiver device.

12. The method according to claim 10, further comprising displaying, by at least one of the screen receiver devices, the image data received from screen transmitter device, and
wherein receiving the voice input comprises receiving the voice input after the displaying the image data.

13. A method for sharing a screen between or among a screen transmitter device providing image data and one or more screen receiver devices connected to the screen transmitter device via a network to receive a work instruction at a remote site, comprising:
receiving, by the screen transmitter device, a definition of a shared area to share screen display, the shared area being defined by an operation of a user of the screen transmitter device;
receiving, by at least one of the screen receiver devices, a voice input of a work instruction from an instructor operating said at least one of the screen receiver devices;
converting, by at least one of the screen receiver devices, the input voice into text data by voice recognition;
transmitting, by at least one of the screen receiver devices, the text data to the screen transmitter device; and
displaying, by the screen transmitter device, image data of the defined shared area and the text data received from at least one of the screen receiver devices inside and outside the defined shared area, respectively.

14. The method according to claim 13, wherein the screen receiver devices include a first screen receiver device and a second screen receiver device, and
wherein the method further comprises setting a display mode of the text data received from the first screen receiver device to be different from a display mode of the text data received from the second screen receiver device.

15. The method according to claim 13, further comprising displaying, by at least one of the screen receiver devices, the image data received from screen transmitter device, and
wherein receiving the voice input comprises receiving the voice input after the displaying the image data.

* * * * *